United States Patent [19]

Crane et al.

[11] 4,052,344

[45] Oct. 4, 1977

[54] METHOD OF RECLAIMING SCRAP VULCANIZED RUBBER AND THE SOLUBLE RECLAIMED RUBBER THUS PRODUCED

[75] Inventors: Grant Crane; Edward Leo Kay, both of Akron, Ohio

[73] Assignee: The Firestone & Rubber Company, Akron, Ohio

[21] Appl. No.: 365,381

[22] Filed: May 30, 1973

[51] Int. Cl.² ............................................. C08J 11/04
[52] U.S. Cl. ............................. 260/2.3; 260/33.6 A; 260/710
[58] Field of Search ..................... 260/2.3, 710, 33.6 A

[56] References Cited

U.S. PATENT DOCUMENTS

| 3,563,922 | 2/1971 | Massoubre | 260/2.3 |
| 3,674,433 | 7/1972 | Wyatt | 260/2.3 |
| 3,700,615 | 10/1972 | Scott | 260/2.3 |

OTHER PUBLICATIONS

Ball, J. M., *Reclaimed Rubber,* Rubber-Reclaiments Assoc. Inc., New York, (1947), pp. 120–122.
Kartzev et al., *Chemical Abstracts,* vol. 30, (1936), p. 7384, (6–8) The Reclaiming of Synthetic Rubber by the Sol'n Method.

*Primary Examiner*—Wilbert J. Briggs, Sr.

[57] ABSTRACT

A first charge of 10 to 100 parts by weight of scrap vulcanized rubber is added to 100 parts by weight of a hydrocarbon solvent, and the resultant mixture is heated at 400° to 700° F. until the rubber is solubilized. At least one additional charge of scrap rubber is made to increase the percentage of rubber in the mixture to at least 60% by weight and the heating is continued until all the rubber is solubilized. The product is incorporated into new rubber articles.

9 Claims, No Drawings

METHOD OF RECLAIMING SCRAP VULCANIZED RUBBER AND THE SOLUBLE RECLAIMED RUBBER THUS PRODUCED

BACKGROUND OF THE INVENTION

This invention relates to a process for reclaiming vulcanized rubber, to the soluble reclaimed rubber thus produced, and to shaped articles of rubber which contain substantial amounts of the soluble reclaimed rubber.

In recent years the problem of disposing of worn-out tires has become acute. A number of suggestions have been made for their disposal. For example, scrap tires have been disposed of by open-burning which resulted in intolerable heavy pollution of the environment. Non-polluting incineration of scrap tires is possible; however, this method is viewed only as a matter of expediency and is basically wasteful of a rather valuable raw material. Incineration with waste-heat recovery to generate steam is still another improvement in technology to utilize worn-out tires. However, this latter procedure is not a true recycle technology and again can be considered as wasteful of a rather valuable raw material.

U.S. Pat. No. 3,674,433 shows heating of ground scrap rubber in a carbon-black feedstock oil and use of the mixture to produce carbon black. Here again no true recycling is shown.

Few practical methods have been suggested for recycling worn-out tires which would incorporate them in the manufacture of new tires or other new rubber products.

Reclaiming of scrap rubber has been practiced for many years, with digestion and separation of textile materials, and some "de-vulcanization" and degradation of the polymer. Recent increases in processing costs have made these operations uneconomical, however, and many plants have discontinued operation. One of the most expensive steps in conventional reclaiming is concerned with removal of textile fabrics from the scrap. Acid or alkali treatments have been used, together with physical separation of fibers, as by blasts of air or steam. To expedite removal of textile fibers, considerable cost is incurred in size-reduction of the scrap rubber feed, since the tire carcass scrap must be in small particles to allow for fiber removal.

Besides worn-out tires, another disposal problem is presented by defective tires which must be scrapped by the manufacturer. Because of their different chemical and physical nature, they cannot be processed "as is" in conventional reclaiming operations but must be allowed to age in outdoor storage for several years. The storage requirements thus pose an additional problem in reclaiming reject tires of this type.

Thus, the need exists for a reclaiming process which would permit inexpensive recycling of scrap tires to incorporate the valuable rubber they contain into new rubber articles. A reclaimed rubber which is in a form for easy handling and processing is also a desirable goal. Finally, the use of a cost-reducing compounding ingredient in rubber which will improve the processing and handling of the rubber, yet not impair the properties of the finished rubber article is of obvious advantage.

SUMMARY OF THE INVENTION

Briefly stated, the invention provides a method for producing a soluble reclaimed rubber from waste or scrap vulcanized rubber by initially combining about 10 to 100 parts by weight of scrap rubber with 100 parts by weight of a hydrocarbon solvent and heating this mixture at 400° to 700° F., preferably 500° to 600° F., until the scrap rubber is solubilized. Then, further additions of scrap rubber are made until the percentage by weight of rubber exceeds about 60% while the heating is continued until all the scrap rubber is solubilized. The additions can be made all at once, in increments, or continuously until the desired amount is added. The hydrocarbon solvent preferably contains a substantial proportion of aromatic hydrocarbons, and can be an aromatic rubber processing oil, or benzene, toluene, xylene or anthracene, or mixtures thereof.

Thus, the invention provides a way to utilize scrap tires in a true recycling process, and also provides a process by which a soluble reclaimed rubber product in convenient form can be produced which approaches 100% rubber.

The novel soluble reclaimed rubber is also provided as part of the invention.

DETAILED DESCRIPTION OF THE INVENTION

In general, the vulcanized rubber to be treated will be in the form of used or scrap tires. Other forms and sources of vulcanized scrap rubber may be treated, however, and the method is applicable to any vulcanized rubber article for which recycling is desired. The polymeric content of the articles can be natural rubber or synthetic rubber, or blends of the two. By synthetic rubber is meant, chiefly, homopolymers of butadiene, isoprene, chloroprene, or piperylene, or copolymers of these monomers with each other or such comonomers as styrene, alpha methyl styrene, divinyl benzene, ethylene, propylene, isobutylene, an ethylenically unsaturated carboxylic acid, ester or nitrile and the like.

The rubber can contain conventional sulfur curing systems, antioxidants, antiozonants, pigments, softeners and other well-known rubber chemicals and compounding ingredients. In any case, the rubber is sufficiently cross-linked, cured, or vulcanized as to be suitable for its original use, so that it will maintain its shape and have a certain degree of resiliency and elasticity. The process of the invention is not intended for use on scrap raw rubber, which has not been vulcanized or cross-linked. There is no reason why such scrap could not be treated similarly, but vulcanized or cross-linked rubber scrap is more plentiful, and presents a far more difficult recycling problem. It has also been found that scrap tires which have been rejected because of defects are compatible with the process of the invention, without the need to age them several years as required in conventional process. Thus, newly manufactured scrap tires can also be treated, as well.

If the vulcanized rubber is in the form of used or scrap tires it will normally contain reinforcing elements of metal or glass or organic fiber. These elements, or some of them, can be removed by a relatively expensive pre-treatment, or they can be left in place during the treatment. Removal of metal bead wires is preferred and is relatively inexpensive, but removal of cord elements is rather difficult and expensive by a pre-treatment, and the cords can usually be left in place. The presence of organic fibers in the rubber does not present a serious problem. Fibers of Nylon 6, Nylon 66 or polyethyleneterephthalate will be easily dispersed or solubilized in the hydrocarbon solvent along with the rubber. In the case of rayon fibers, these materials usually retain their integrity, and can be removed by screening, if desired. Glass or steel cord will similarly be unaffected by the treatment and can be similarly removed, if desired.

If desired, the vulcanized rubber can be treated to reduce its particle size before the treatment. Although there is no theoretical reason why a whole scrap tire cannot be utilized in the process of the invention, certain practical constraints must be considered. Because of the bulky nature of a scrap tire the rate of solubilization in the hydrocarbon solvent is generally prohibitively slow, and size-reduction operations are recommended for such bulky structures. Size-reduction can be performed in any conveninent manner, and the particle size can be any size which facilitates handling. Commercial machinery is available which is capable of cutting a whole tire into small irregular size fragments, including the beads, which fragments are quite suitable for the process of the invention. If the beads or other steel reinforcing elements are not removed beforehand, they can be screened out of the product or removed by magnetic separation means. A reasonably small particle size piece of scrap rubber vulcanizate is desired from the standpoint of charging the reactor and ease of stirring the mixture. An upper limitation of about 100 parts of scrap rubber per 100 parts of hydrocarbon solvent is specified for the initial charge, in order to maintain good heat transfer and a low enough viscosity so that the mixture can be stirred. Considerations of cost of size-reduction by mechanical means vs increased solubilization rates for smaller particles will generally dictate what size-reduction measures will be employed, if any. If continuous addition of scrap rubber is done, size-reduction is especially recommended for the additional charges.

The hydrocarbon solvent used can be chosen from a variety of materials and combinations thereof. In general, a solvent which contains a substantial portion of aromatic constituents is preferred. The aromatic portion of the solvent can be a low-boiling aromatic hydrocarbon, such as benzene, or it can be a higher boiling homologue, such as toluene, xylene, naphthalene, anthracene, phenanthrene, etc., or mixtures of two or more of these compounds.

Alternatively, the solvent can be a standard product of a refinery which is normally used as a fuel, paint-thinner, or the like, provided that a substantial proportion of the solvent is aromatic.

Where a high-boiling solvent is desired, a so-called rubber processing oil may be preferred, and can be used to advantage. A rubberprocessing oil can be selected from a number of such products which are commercially available. It has been found that aromatic processing oils are especially effective in the process and product of the invention. Hydrocarbon oils derived from petroleum or coal tar are recommended. These oils are commonly used in rubber compounding, and are generally described as "naphthenic", "aromatic", or "paraffinic", depending on the type of predominant structure present in the oils. Any or all of these oils are operable in the process of the invention, however, the oils generally described as "aromatic", or "highly aromatic" are preferred. A description of some of the preferred oils is found in A.S.T.M. specification D2226, with specific reference to types 101 and 102 listed therein.

One such oil, found to be particularly effective in the process of the invention is identified by its manufacturer as "Dutrex 726", with the following typical properties specified:

| | |
|---|---|
| Specified gravity at 60° F. | 0.9895 |
| Viscosity, SSU, 212° F. | 83 |
| Flash point, C.O.C., ° F. | 425 |
| Volatility, 22 hrs. at 225° F., wt % | 0.2 |
| Neutralization No., mg. KOH/g. | 0.80 |
| Aniline point, ° F. | 105 |

In the initial charge, from 10 to 100 parts by weight of vulcanized scrap rubber per 100 parts by weight of the hydrocarbon solvent is recommended. Normally, the final proportions will be dictated by the characteristics of the soluble reclaim desired. The other processing variables, namely, temperature, agitation (if used), the nature of the rubber and the composition of the hydrocarbon solvent, will determine the character of the soluble relcaim, along with the final relative proportions of rubber and solvent, and the number and rate of additional charges. While the precise nature of the change is not known, it is surmised that one effect of the treatment of the rubber is to depolymerize a portion of the rubber to produce lower molecular-weight materials which reduce the viscosity of the soluble reclaim, and dissolve a substantial portion of the rubber. In any event, by using the process of the invention it is possible to approach, asymptotically, 100 percent rubber in the finished composition. After the initial, relatively low level of scrap rubber is solubilized, further additions of scrap continue to be solubilized, with, apparently, no limit to their total amount. Of course, since the hydrocarbon solvent originally charged remains present in the mixture, the amount of rubber can never reach 100 percent. Also, practical limitations of time and reactor capacity will necessarily dictate a final composition of, for example, 90 percent rubber and 10 percent hydrocarbon solvent.

The process of the invention can be operated so as to remove the final product continuously from the reaction zone, or, after the last additional charge of rubber has been solubilized, the entire mass can be removed at once.

Heat treatment at temperatures from 400° to 700° F., preferably 500° – 600° F., is recommended. Naturally, the effects of time and temperature are interrelated, so that longer time will generally be required for lower temperatures, and vice versa. Temperatures lower than 400° F. are generally not economical, since too long a treatment time would be required. Temperatures above 700° F. may result in some carbonization of the soluble reclaim, and would also require high operating pressures in the presence of low-boiling hydrocarbons which are generated in the process. Where high concentrations of rubber in the soluble relcaim ae desired, the treatment will necessarily be more severe, in the higher ranges of both time and temperature.

The materials comprising the first charge are heat-treated for a sufficient time to solubilize the rubber. This time can vary from as little as 0.1 hour to as much as 50 hours or more. The degree of solubilization of the rubber initially charged should approach 100 percent, but need not necessarily be complete. When the solubilization of the first charge is substntially completed, additional charges can be made, and heat-treatment should continue until the rubber is completely solubilized. Again, the time required for solubilization can vary widely.

Another factor which affects the time and temperature of the process is the particle size of the rubber, which is indicative of its surface area. The larger surface area which accompanies a reduction in particle size will improve contact between the rubber and the solvent, and thus speed the dissolution process. Better heat-transfer is also realized with smaller particles, hence, the reaction rate is increased. Since size-reduction adds cost to the product, the cost of this operation must be taken into account, offsetting increases in the rate of the dissolution reaction.

Agitation, while not essential to the process of the invention, generally acts to increase the dissolution rate. Both shear and displacement act to facilitate the process, effecting some size-reduction, and improving heat-transfer.

The soluble reclaims which are the products of the invention vary from liquid to solid at normal temperatures, and can be readily used in substantial quantities as a compounding ingredient in rubber articles of a wide variety of compositions. While the principal use is in tires, usually pneumatic tires, a variety of other elastomer-containing articles can incorporate from about 5 to about 500 or more parts of the reclaim per 100 parts of the elastomer used.

The effect of the soluble reclaim on the elastomeric article into which it is incorporated will depend not only on the quantity used, but on the nature of the vulcanized rubber which is the starting material for the soluble relcaim and the process conditions employed. First, the rubber should be of a type which is compatible with the elastomer into which it is incorporated. Also, the various non-rubber constituents of the vulcanized rubber scrap should be such as will be helpful, or at least not harmful to the finished elastomeric article. Additionally, higher processing temperatures and longer times will tend to depolymerize the scrap rubber to a greater degree, giving a softer product.

In general, the procedure for preparing the soluble rubber reclaims is to charge an autoclave with a portion of the scrap rubber vulcanizate and a hydrocarbon solvent and to heat the mixture to effect dissolution of the hydrocarbon portion of the vulcanized scrap rubber. After the first portion is substantially solubilized, an additional charhge or charges of rubber are added, and heating is continued until all the rubber is solubilized. If the scrap vulcanized rubber charge had been previously treated to remove fabric, the soluble rubber reclaim obtained from the autoclave can be used without further treatment. If the scrap vulcanized rubber charge contained fabric, the soluble reclaim as obtained from the autoclave can be screened, if desired, to remove undissolved glass, steel or rayon fabric. As mentioned above, fabrics of nylon or polyester will generally not remain intact, and are not a problem. Magnetic separation can be employed if steel fragments are to be removed.

As a result of the process, odoriferous gases are often generated. If odor is a problem in the product, these gases can be removed, for example, by applying a partial vacuum to the autoclave when the mixture has a sufficiently high temperature for the gases to flash off. conveniently, if screening is employed, the vacuum treatment can be done just before the screening.

A more complete understanding of the invention can be obtained by reference to the following examples, in which all percentages are by weight, unless otherwise identified.

EXAMPLE I

Eighty pounds of an aromatic processing oil (Dutrex 726) were charged to a 20-gallon reactor. The reactor was then charged with forty pounds of scrap rubber vulcanizate in the form of pieces approximately 2 × 1 × 1/4 inches. The scrap rubber was obtained by cutting up whole scrap tires which were previously rejected by a retreading shop as unsuitable for retreading. The scrap rubber used did not contain bead wire but did contain reinforcing fabric such as steel, glass, rayon, nylon and polyethyleneterephthalate. No attempt was made to isolate pieces of scrap rubber containing a specific fabric. The scrap rubber used is believed to be statistically representative of rejected (by retread shops) scrap tires with no attempt to segregate the scrap by type of fabric contained therein.

The reactor was heated to a nominal temperature of 540° F. and maintained at nominally 540° F. for a period of 24 hours to effect dissolution of the hydrocarbon portion of the scrap rubber. The mixture was cooled to about 200° F and 30 pounds of the soluble reclaim was removed for testing. This 30 pound sample is referred to as "Sample A" in the following table and conained a nominal 33 percent scrap rubber in the soluble reclaim.

An additional 30 pounds of scrap rubber vulcanizate pieces were charged to the reactor. The contents were heated at about 540° F. for about 24 hours to effect dissolution of the hydrocarbon portion of the 30 pounds of added scrap rubber.

The mixture was cooled to about 200° F., and a 60 pound sample of the soluble reclaimed rubber removed for testing. This sample is referred to as "Sample B" in the following table. Sample B contains a nominal 50 weight percent scrap rubber based on the soluble relcaim.

In this manner, an additional 60 pounds of scrap rubber vulcanizate were added to the reactor and heated for 24 hours at 240° F. Seventy pounds of the produced soluble relcaim was identified as "Sample C" for testing. Sample C contained about 75 weight percent of scrap rubber based on the total weight of the soluble reclaim.

An additional 75 pounds of the scrap vulcanized rubber pieces were charged to the reactor; heated at 540° F. for 24 hours to effect dissolution of the hydrocarbon portion of the added scrap rubber. This soluble reclaimed sample contained nominally 90 weight percent of scrap rubber based on total reclaim weight. This sample is referred to as Sample D in the following table.

To demonstrate the utility of the soluble rubber reclaims prepared by the incremental addition technique, the fabric was removed from small portions of Samples A, B, C and D by screening and the scorch and cure rate properties of a conventional rubber compound containing the screened samples were determined. The stress/stran properties of the vulcanized conventional rubber compound containing the screened samples were also determined.

The experimental data are summarized in Tables I and II.

TABLE I

| | Scorch and Cure Rate Data | | | | |
| Run No. | 1 | 2 | 3 | 4 | 5 |
| --- | --- | --- | --- | --- | --- |
| 1. Control: Conventional Rubber Compound[1] Plus phr of Dutrex 762 | 45 | — | — | — | — |

TABLE I-continued

| | Scorch and Cure Rate Data | | | | |
|---|---|---|---|---|---|
| Run No. | 1 | 2 | 3 | 4 | 5 |
| Experimental: Conventional Rubber Compound Plus phr of Sample | | | | | |
| 2. A | — | 45 | — | — | — |
| 3. B | — | — | 45 | — | — |
| 4. C | — | — | — | 45 | — |
| 5. D | — | — | — | — | 45 |
| Monsanto Rheometer, 300° F., 1° Arc., 100 rpm, mini die | | | | | |
| Time to scorch, min. | 11.8 | 8.6 | 9.9 | 8.3 | 7.8 |
| Time to optimum cure, (90%) min. | 20.7 | 15.0 | 16.6 | 15.5 | 15.8 |
| Cure Rate Index[2] | 11.2 | 15.6 | 14.9 | 13.9 | 12.5 |

[1]Conventional Rubber Compound-100 parts by weight of a styrene/butadiene elastomer prepared in a hydrocarbon solvent, plus the usual amounts of sulfur, accelerator, zinc oxide, carbon black and stabilizer,
[2]Cure Rate Index is defined as 100/(Time to 90% Cure-Time to scorch).

As shown by the data summarized in Table I, the time to scorch of the experimental compounds containing Samples A, B, C and D were less than the control. Although the scorch times of the experimental stocks are lower than the control, the scorch values are acceptable for commercial operation.

The time to 90 percent cure (so-called optimum cure) of the experimental stocks are all lower than the value of 20.7 minutes for the control (Run No. 1). The faster cure rate of the experimental stocks is reflected in the cure rate index values. All of the experimental stocks have higher cure rate indices than the control. A high cure rate index is desirable because it is indicative that the production rate of cured rubber articles in a factory can be increased.

TABLE II

| | Stress/Strain Data | | | | |
|---|---|---|---|---|---|
| Run No. | 1 | 2 | 3 | 4 | 5 |
| 1. Control: Conventional Rubber Compound[1] plus phr Dutrex 726 | 45 | — | — | — | — |
| Conventional Rubber Compound plus phr of Sample | | | | | |
| 2. A | — | 45 | — | — | — |
| 3. B | — | — | 45 | — | — |
| 4. C | — | — | — | 45 | — |
| 5. D | — | — | — | — | 45 |
| Cured at 300° F. | | | | | |
| 300% Modulus psi, at | | | | | |
| 15' | 875 | 1350 | 1475 | 1850 | 2100 |
| 23' | 1475 | 1525 | 1675 | 2125 | 2375 |
| 30' | 1550 | 1525 | 1650 | 2075 | 2400 |
| Tensile, psi, at | | | | | |
| 15' | 2875 | 3050 | 2800 | 3050 | 2775 |
| 23' | 3125 | 2900 | 2875 | 3050 | 2850 |
| 30' | 2850 | 2875 | 2725 | 3025 | 2925 |
| Elongation, %, at | | | | | |
| 15' | 710 | 560 | 520 | 490 | 400 |
| 23' | 530 | 500 | 480 | 430 | 360 |
| 30' | 490 | 490 | 460 | 430 | 350 |

[1]Conventional Rubber Compound-as defined in Table I.

The stress/strain data summarized in Table II generally indicate that the experimental Reclaims A, B, C and D all have a beneficial effect in a conventional rubber compound. Specifically, the modulus values for the stocks containing the experimental reclaims (Samples A, B, C and D), are all higher than the control (Run No. 1).

The individual tensile values of the experimental stocks vary slightly but generally can be interpreted as being essentially equivalent to the control (Run No. 1).

The percent elongation values of the experimental stocks at equivalent cure times to the control are generally lowe than the elongation value of the control. These data indicate that the experimental stocks have a tighter cure than the control at equivalent tensile values.

It can be seen that the process of the invention provides a novel and direct route for recycling scrap vulcanized rubber into new articles of rubber. Compared to conventional reclaiming methods, the instant process teaches a less expensive way to remove non-rubber constituents or to render them effectively soluble.

The product of the invention, a new, soluble reclaimed rubber, is in a form more suitable for compounding into rubber articles. By judicious choice of elastomers and compounding ingredients, a substantial amount of the new reclaim can be incorporated, with optimization of the properties of the finished article.

The foregoing information is intended as merely illustrative of the invention, the scope of which is defined by the appended claims.

We claim:

1. The process of producing a soluble reclaimed rubber from vulcanized rubber by the steps of
   combining a first charge of vulcanized rubber with a hydrocarbon solvent in the ratio of about 10 to 100 parts of rubber to 100 parts of solvent, by weight,
   maintaining the resultant mixture at a temperature of from 400° to 700° F. until the rubber is solubilized,
   adding to the solubilized mixture thus formed at least one additional charge of vulcanized rubber in an amount sufficient to increase the rubber content of the mixture to at least 60 percent by weight.
   while maintaining the temperature of the mixture between 400° and 700° F, until all of the vulcanized rubber has been solubilized.

2. The process of claim 1, wherein the temperature of the mixture is maintained between 500° and 600° F.

3. The process of claim 1, wherein at least two additional charges are added, in increments.

4. The process of claim 1, wherein the additional charge is a single continuous one.

5. The process of claim 1, wherein the hydrocarbon solvent is an aromatic processing oil.

6. The process of claim 5, wherein the aromatic processing oil is defined by A.S.T.M. Specification D2226, types 101 or 102.

7. The process of claim 1, wherein the total rubber content of the mixture is at least 75%.

8. The process of claim 1, wherein the vulcanized rubber is in the form of scrap tires.

9. The process of claim 8, wherein the scrap tires have been de-beaded and subjected to a size-reduction operation.

* * * * *